H. WEWERKA.
METHOD OF PRODUCING HOLLOW BODIES FROM CONCRETE OR CLAY BY CENTRIFUGAL ACTION.
APPLICATION FILED SEPT. 25, 1909.
1,117,466.
Patented Nov. 17, 1914.
5 SHEETS—SHEET 1.
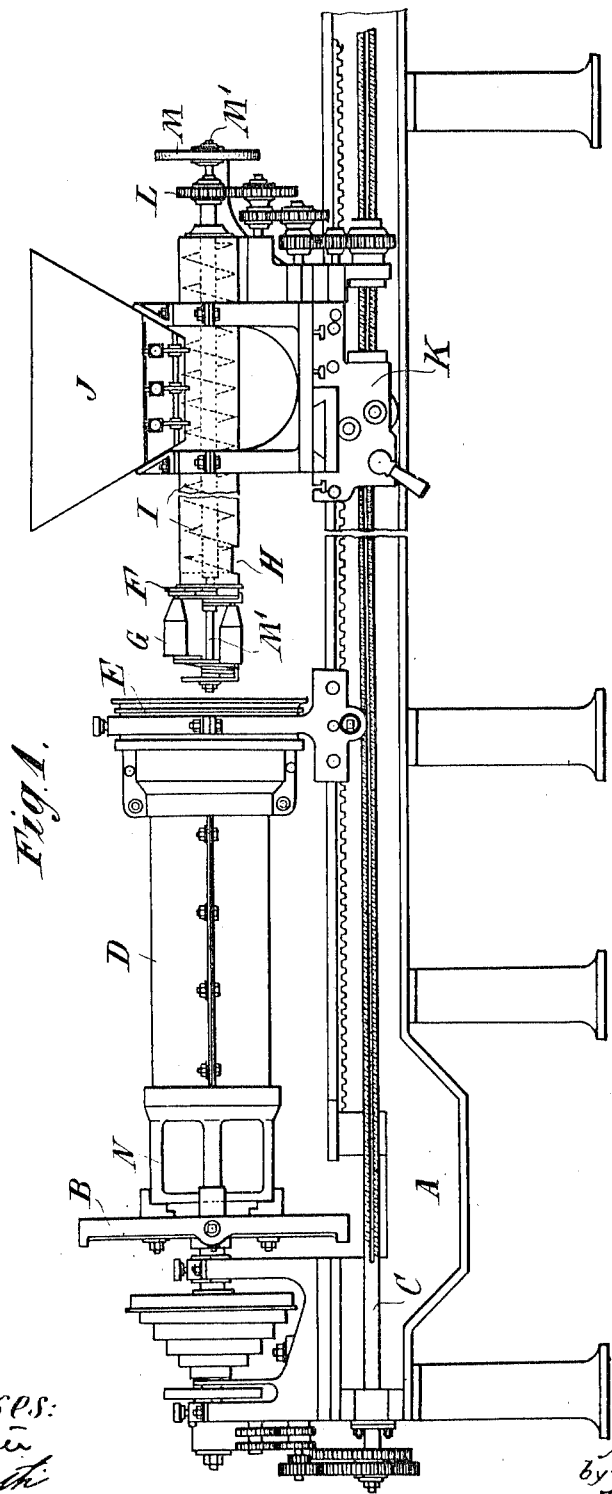

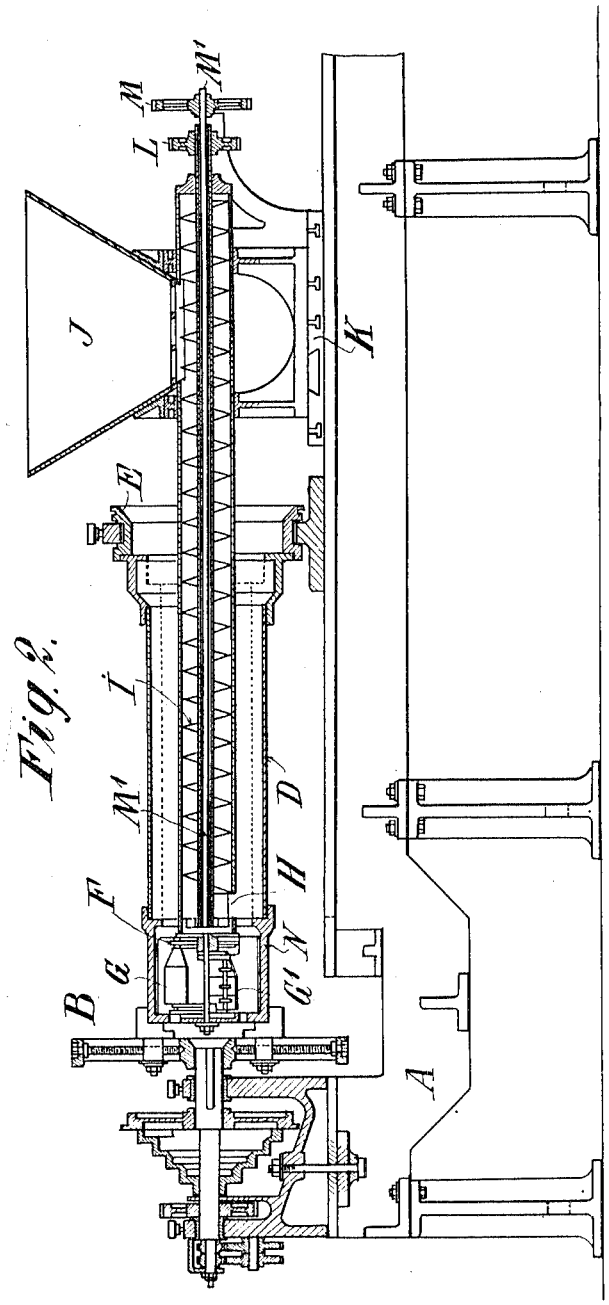

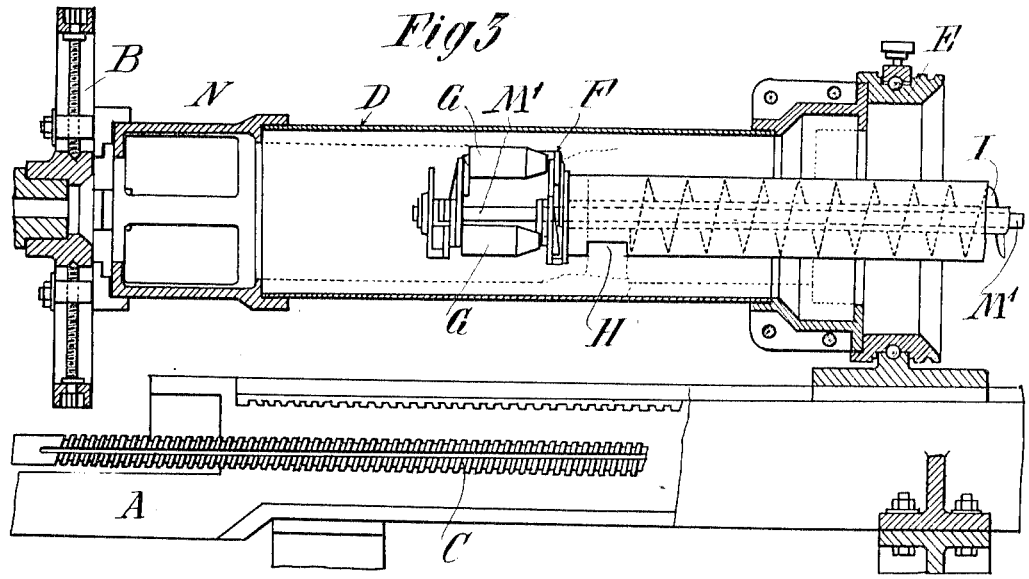
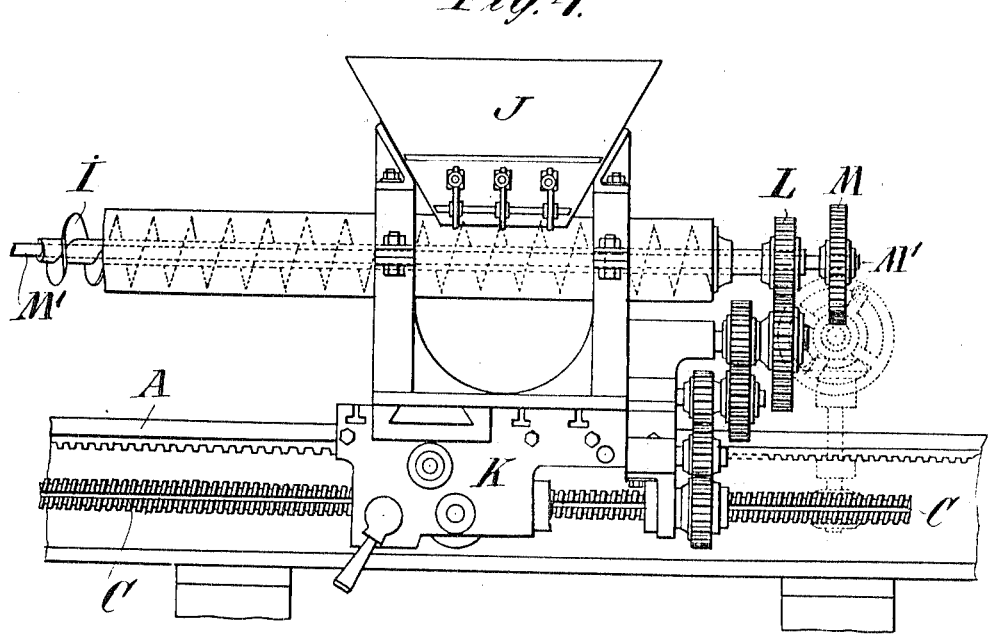

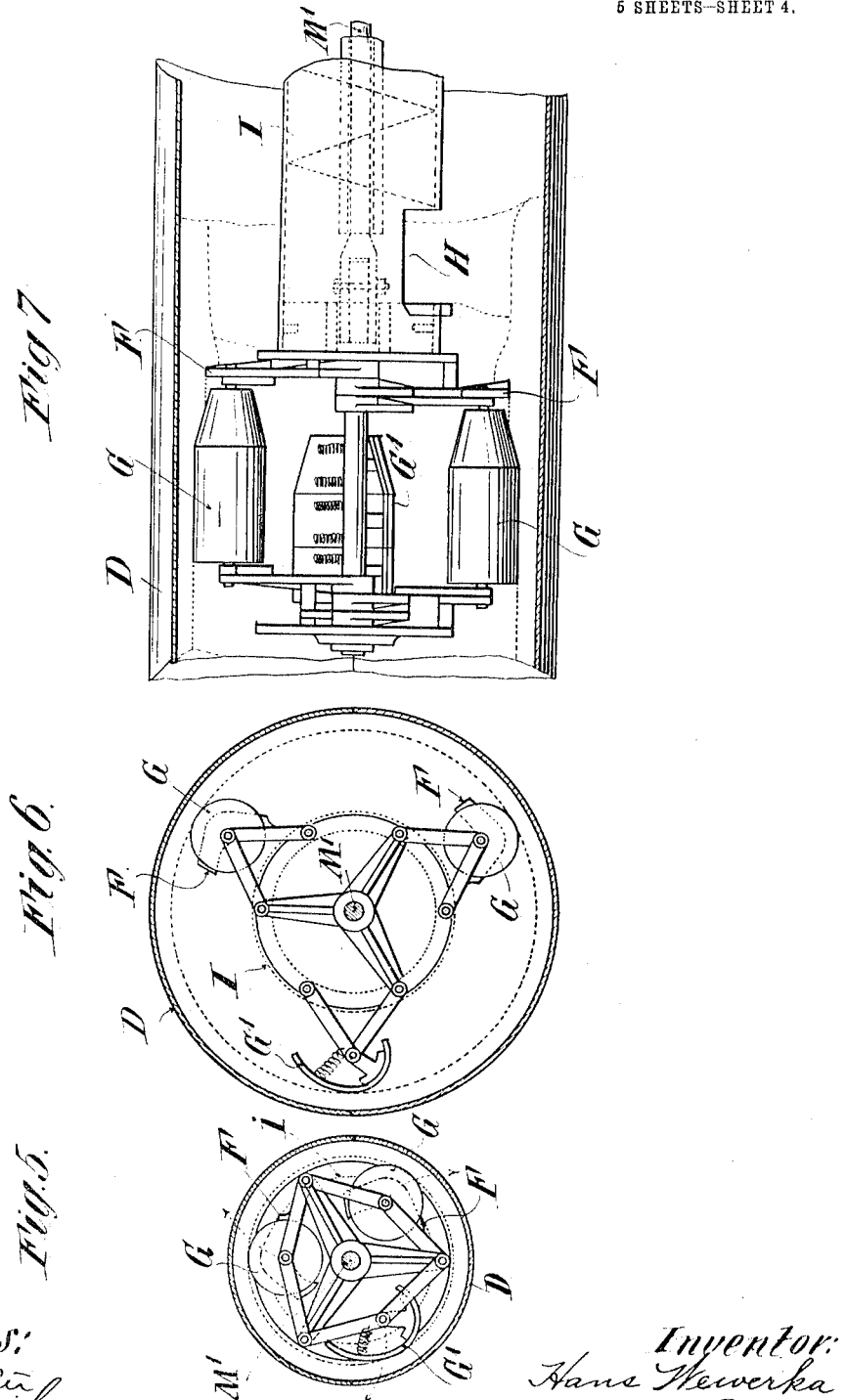

H. WEWERKA.
METHOD OF PRODUCING HOLLOW BODIES FROM CONCRETE OR CLAY BY CENTRIFUGAL ACTION.
APPLICATION FILED SEPT. 25, 1909.
1,117,466.
Patented Nov. 17, 1914.
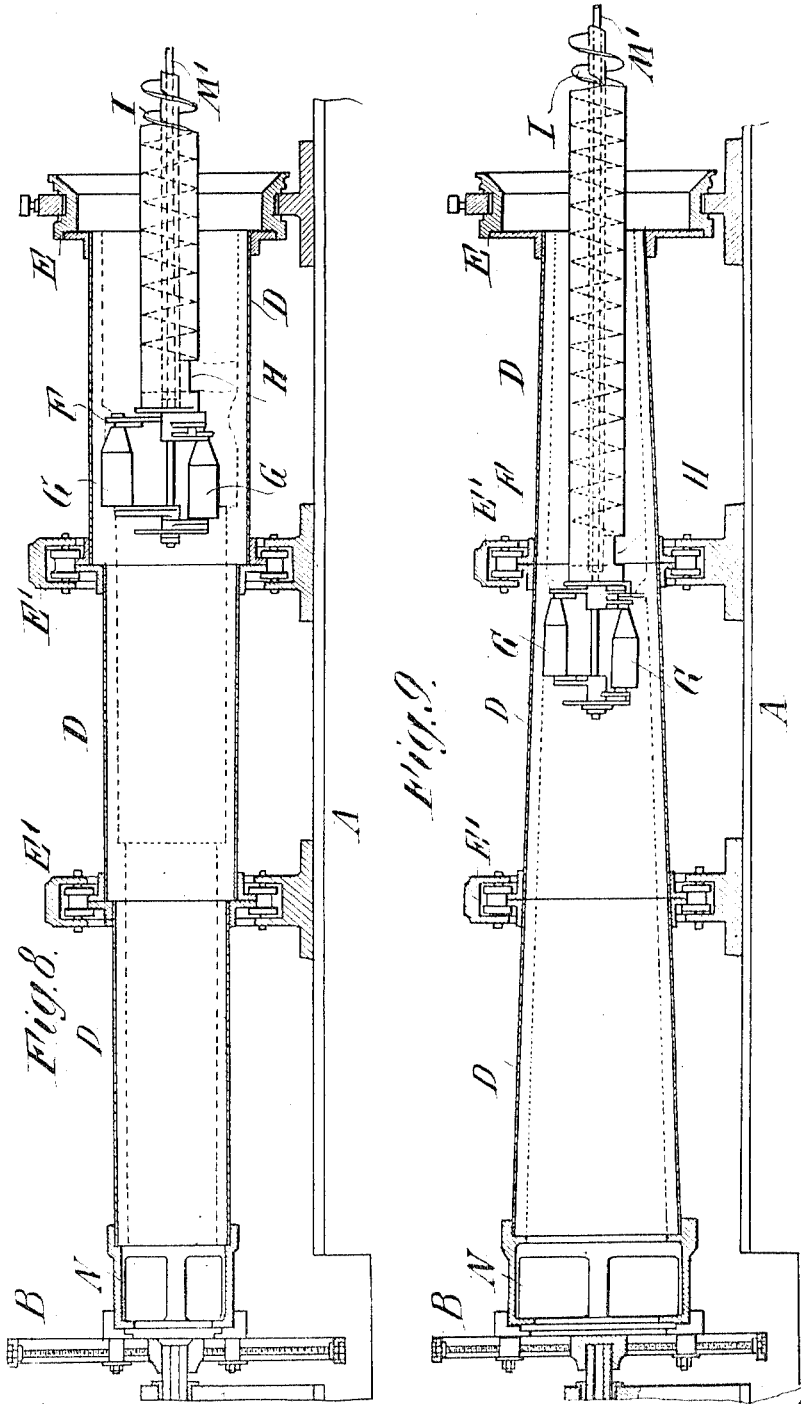

UNITED STATES PATENT OFFICE.

HANS WEWERKA, OF TEPLITZ-TURN, AUSTRIA-HUNGARY.

METHOD OF PRODUCING HOLLOW BODIES FROM CONCRETE OR CLAY BY CENTRIFUGAL ACTION.

1,117,466.　　　　　Specification of Letters Patent.　　Patented Nov. 17, 1914.

Application filed September 25, 1909. Serial No. 519,550.

*To all whom it may concern:*

Be it known that I, HANS WEWERKA, a citizen of Austria-Hungary, and resident of Teplitz-Turn, in the Province of Bohemia and Empire of Austria-Hungary, have invented certain new and useful Improvements in Methods of Producing Hollow Bodies from Concrete or Clay by Centrifugal Action, of which the following is a specification.

The present invention relates to a process for the production of hollow objects of plastic material, said objects having a pipe-like form and having any length within the limits of the apparatus employed for carrying out said process.

The employment of centrifugal action in the production of hollow objects of cement has already been proposed but in such case only a viscid substance was treated by itself in a vertical centrifugal machine, a rigid non-yielding wiping and smoothing appliance being used which had to be selected to suit the particular internal profile and which did not exert any pressure internally, or a quite liquid substance was treated in a mold closed at both ends for the purpose of driving excess of water to the interior; whereas, in the present case the loose and merely plastic material is introduced by a suitable contrivance into a horizontally rotating mold open at both ends, in which the internal molding of the hollow body is directly effected by wiping devices, pressure rollers and smoothing contrivances, operating in conjunction with the centrifugal action on the interior of the hollow object to be formed, thereby influencing the thickness of the walls, the degree of compression, *i. e.* the consolidation of the material, however, depending upon the internal adjustable pressing contrivance. Any ordinary high speed face-plate traversing lathe can be used for carrying out the process, to the face-plate of which lathe is secured the two or multiple-piece mold corresponding to the external form of the hollow object which is to be produced.

The mold, open at both ends, may be built up of a plurality of sections of suitable lengths, according to the length of the object to be produced, and is supported at appropriate points by suitable collar bearings so that it revolves truly horizontally and co-axially with the face-plate, one of its open ends however, being exposed for permitting operations within its interior. In this rotating mold, for reinforced objects a reinforcement, which preferably is in the form of wire fabric or netting is inserted and secured at a suitable distance from the internal surface of the mold. The concrete, artificial stone or the clay is now introduced by a conveyer into the interior at a rate corresponding to the desired thickness of wall, which on the one hand as a consequence of the rotation of the mold and also of the longitudinal motion which is impressed upon the conveyer device, is, by virtue of the centrifugal action distributed helically, uniformly and loosely upon the internal periphery of the mold, whereupon it simultaneously penetrates the meshes of the reinforcement, and on the other hand the necessary consolidation is brought about by a wiping-pressure and smoothing contrivance set to the clear internal diameter of the hollow body which is being formed.

A form of machine for carrying out the process is illustrated in the accompanying drawings, wherein;

Figure 1 is a side elevation of the machine, suitable for producing a socketed pipe in homogeneous material, the contrivance for feeding the material being wholly withdrawn from the mold. Fig. 2 is a longitudinal section of the same machine, showing the parts in the position which they assume at the beginning of the molding operation. Fig. 3 is a longitudinal section drawn to a larger scale of the mold, together with its means of attachment and the end directed toward it of the contrivance for feeding, wiping, pressing and smoothing the material. Fig. 4 is a side elevation, also on a larger scale, of the rear portion of the contrivance for feeding the material. Fig. 5 is an end elevation of the wiping, smoothing and pressing contrivance, showing the parts adjusted to the smallest internal diameter of the object to be produced. Fig. 6 is a similar elevation showing the parts adjusted to the largest internal diameter. Fig. 7 is a corresponding longitudinal section showing the parts in the latter position. Fig. 8 illustrates by a longitudinal section the method of conducting the process for constructing pipes with stepped increasing internal profile and the fold therefor. Fig. 9 is a view similar to Fig. 8 illustrating the production of conical pipes with tapered internal profile and uniform thickness of wall.

The production of a socket pipe of homogeneous material is effected as follows: In a mold D, which can be taken to pieces and which contains the reinforcement (which for short pipes consists of longitudinal wire ribs with wire netting, and for lengthy objects such as pillars, girders, etc. consists of iron rods in sufficient number and strength to withstand the load and tensional stresses, together with interlaced wire) by means of a conveyer screw I, which is displaceable in the axial direction by the traversing screw C, or by a suitable rack and pinion gear, the merely plastic mass (i. e. concrete, artificial stone, which has been moistened with water to such a degree that when taken in the hand it will under pressure form a ball, without, however, any water separating out, or clay in the consistency at which it is suitable for being worked by hand) is introduced from a feed-hopper J, independently of the mold which is in rotation. Whereas the mold is open at both ends, the conveyer screw I moves in a tube which is closed at both ends and which is mounted at its rear end on the slide rest K, which carries the hopper J, and is displaced by the traversing screw C, being provided with an inlet opposite the hopper and with an outlet H at the front end through which the mixed material is loosely delivered into the mold D at the desired rate in a helical manner.

The adjustable contrivance F, G, G′ for wiping off excess of material and pressing and smoothing the remainder thereof, which contrivance is mounted at the front end of the conveyer-inclosing tube immediately in front of the outlet H and which, on the machine being initially started, is situated within a drum N in front of the mold D, can be adjusted from the exterior by a hand-wheel M so as to exert the required pressure and impart the desired size of internal profile to the object which is to be produced. A slight angular displacement of the hand-wheel M and thereby of its spindle M′ causes, by means of a three-armed spider m, the supporting links n of the device F, G, G′ to approach toward or recede from one another, thus determining the radial position of the device. The contrivance referred to is illustrated in Figs. 5 to 7 and consists of a wiper F, adjusted to suit the mold, being set to a smaller radius, and a pressing roller G following immediately behind, the cone end of which displaces the material to form the desired internal profile. The smoothing device G′ is a spring-mounted yielding piece which on rotation of the apparatus smooths the internal surface of the wall previously pressed by the roller G.

On the entire machine being set in operation, the mold D will revolve by virtue of being at the front end connected by the drum N to the face-plate B and at the rear end rotatably mounted in the collar-bearing E; the mixed material is, by means of the conveyer screw I delivered into the mold loosely and uniformly in a helical manner, along the constantly changing surface of the mold opposite the outlet H, and is held against same until the wiping, pressing and smoothing contrivance F, G, G′ which follows immediately behind the conveyer, operates thereon. The interior surface is thus accurately pressed and evened off, whereby an absolutely uniform structure and an accurately smooth internal surface is imparted to the molded object. The operation having proceeded as far as the socket portion of the pipe which is being formed, seen in Figs. 2 and 3, the wiping, pressing and smoothing contrivance F, G, G′ is set to a larger diameter corresponding to the width of the socket, by means of the hand-wheel M and spindle M′ and the introduced strip of material for forming the socket is then pressed outwardly in the above described manner. The molding of the pipe being now completed and the collar bearing E laterally displaced, the mold containing the pipe is removed from the machine to one side where the pipe is immediately removed from the mold D, which latter is again placed in the machine in order to be ready for use again. If lengthy objects, such as posts, girders, etc., are to be produced in one piece, the conveyer screw I and also the mold D is correspondingly increased in length, or, when the object has been produced as far as the collar-bearing E, another mold may be placed end-on to the first and secured thereto, separable collar-bearings being employed instead of the collar-bearing E, and the production of the object is continued in such added mold. In this manner, with a suitably long bed, objects of any desired length may be produced in one piece with a uniform internal diameter or one increasing step by step. Should it be desired to form stepped local variations in the thickness of the wall or provide internal enlargements of bore, as illustrated in Fig. 8, the wiping, pressing and smoothing contrivance F, G, G′ is correspondingly enlarged at the appropriate points during the operation of the machine, by turning the spindle M′ by means of the hand-wheel M. Fig. 8 also shows the construction of the mold and its manner of support in the collar-bearings E.

By this method can equally well be produced hollow objects which are of equal width at both ends, but which at the middle are considerably enlarged, or as shown in Fig. 9, conical hollow objects with a uniform thickness of wall; in the latter case, the wheel M for rotating the spindle M′ is driven through intermediate gearing from the transporter driving gear L, at a rate corresponding to the rate of advance of the wiping, pressing and smoothing contrivance. This intermediate gearing is shown in Fig. 4 and consists on the one hand of the train of spur-wheels $a$, which transmit motion to a spur-wheel L, and on the other hand, of a worm-wheel $b$, driven by the traversing screw C, which by means of the spindle $c$ and bevel-wheels $d$ rotates a worm $f$, which is in engagement with the wheel M. A hand-wheel $g$ is secured to the worm spindle $f$ so as to enable the wheel M to be turned by hand.

What I claim is:

1. The hereindescribed process for the production of hollow objects from plastic material which consists in feeding the plastic material into an open-ended mold while the latter is being rotated, feeding said material progressively in an axial direction during the rotation of the mold to cause the material to be deposited in the form of a narrow helical strip on the interior surface of the mold, and subjecting the inner surface of the material as it is deposited on said surface of the mold to successive wiping, pressing and smoothing actions for the purpose set forth.

2. The hereindescribed process for the production of hollow objects from plastic material which consists in feeding the plastic material into an open-ended mold while the latter is being rotated, feeding said material progressively in an axial direction during the rotation of the mold to cause the material to be deposited in the form of a narrow helical strip on the interior surface of the mold, and subjecting the inner circumferential surface of the material as it is deposited on said surface of the mold to successive wiping, pressing and smoothing actions to cause the plastic material to be forced against the interior surface of the mold, the desired thickness given to the molded object and the interior surface of the latter rendered smooth, and varying the pressure on the material during said wiping, pressing and smoothing actions.

Signed at Vienna in the Province of Lower-Austria and Empire of Austria-Hungary this 15th day of September A. D. 1909.

HANS WEWERKA.

Witnesses:
WILHELM BERGER,
AUGUST FUGGER.